Oct. 8, 1968  T. A. OSIAL ET AL  3,405,316

ELECTRICAL TRIGGERING SYSTEM

Filed June 7, 1966

WITNESSES:
Bernard R. Gregory
James F. Young

INVENTORS
Thaddeus A. Osial, Kenneth B. Steinbruegge
and Richard J. Ravas.
BY R. Lewis Gable
ATTORNEY

United States Patent Office 3,405,316
Patented Oct. 8, 1968

3,405,316
ELECTRICAL TRIGGERING SYSTEM
Thaddeus A. Osial, Pittsburgh, Kenneth B. Steinbruegge, Wilkinsburg, and Richard J. Ravas, Monroeville, Pa., assignors to Westinghouse Electric Corporation, Pittsburgh, Pa., a corporation of Pennsylvania
Filed June 7, 1966, Ser. No. 555,872
4 Claims. (Cl. 315—243)

ABSTRACT OF THE DISCLOSURE

This invention relates to a triggering circuit for an electron discharge device such as a laser pumping lamp and illustratively includes a first capacitor for storing a potential charge less than that required to ignite the laser pumping lamp, a first potential source for charging the first capacitor, an inductance means disposed between the first capacitor and the laser pumping lamp, a second capacitor for initially igniting the laser pumping lamp, a second potential source for charging the second capacitor to a potential sufficient to cause the breakdown of the laser pumping lamp, and a switching means for applying the second capacitor across the pumping lamp so as to apply a potential of an opposite sense to that applied by the first capacitor.

---

Figure 1:
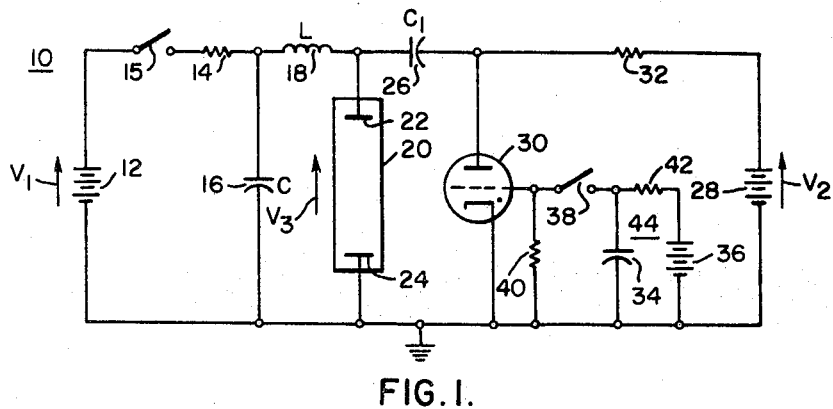

This invention relates to electrical triggering systems and more particularly to such systems for establishing a discharge across a gas discharge device.

There have been developed means such as lasers for establishing coherent beams of light. In order to excite a laser, it is necessary to direct a high intensity source of light on this device. Typically, xenon arc discharge flash lamps have been used for this purpose. In a typical mode of operation, a capacitor or combination of capacitors is charged to a predetermined voltage which is directly applied across the electrodes of the flash lamp. However, this applied voltage is insufficient to cause a discharge through the flash lamp and it is necessary to initially ionize the gas within this device before the arc discharge will occur between the electrodes. One solution to this problem is to provide an external triggering electrode consisting of a winding of wire about the discharge flash lamp to which is applied a trigger pulse of high potential to thereby cause initial ionization of the gas. Once the gas is sufficiently ionized by the trigger pulse, the energy stored in the capacitor or group of capacitors is discharged through the flash lamp thereby generating the desired high intensity light.

However, the above-described electrical triggering system has several disadvantages. First, the use of an external trigger electrode is an inefficient method of providing the initial ionization of the gas, and as a result, a trigger pulse of relatively high potential must be placed upon the external electrodes in order to impress the required field across the envelope (i.e., usually quartz) of the flash tube. In order to use high triggering voltages, the external triggering electrode must be insulated not only from the leads of the discharge flash lamp but also from the electrical connections to the laser head enclosure which is in itself usually metallic. Further, it is often desirable to cool the discharge flash lamp in a medium such as water; however, such cooling mediums are often electrically conductive and tend to cause an erratic triggering because of the low impedance presented by the cooling medium between the turns of the external electrode. In addition, the mounting of the assembly is more difficult and expensive because of the presence of the external trigger electrode.

It is therefore an object of the present invention to provide a new and improved electrical triggering system.

It is a further object of this invention to provide a new and improved electrical triggering system which eliminates the use of an external triggering electrode.

It is a still further object of this invention to provide a new and novel electrical triggering system which requires a lower trigger voltage to initiate ionization within the gas discharge device, and a lower voltage to establish the electrical discharge through the device.

These and other objects are accomplished in accordance with the teachings of the present invention by providing a new and improved electrical triggering system including a gas discharge device with a pair of electrodes for establishing a discharge therebetween, first capacitive means for storing a potential charge and for impressing the potential across the electrodes of the gas discharge device, a second capacitive means directly applied to one of the electrodes, means for applying a potential charge to the second capacitive means, and a switching means for applying the potential as stored upon the second capacitive means directly across the gas discharge device. Further, an inductive element may be inserted in series with the first capacitive means and the electron discharge device to limit the current discharge between the electrodes and also to provide a resonant circuit with the first and second capacitor means whereby a second triggering pulse may be applied to the gas discharge device to provide the initial ionization of the gas therein.

Figure 2:
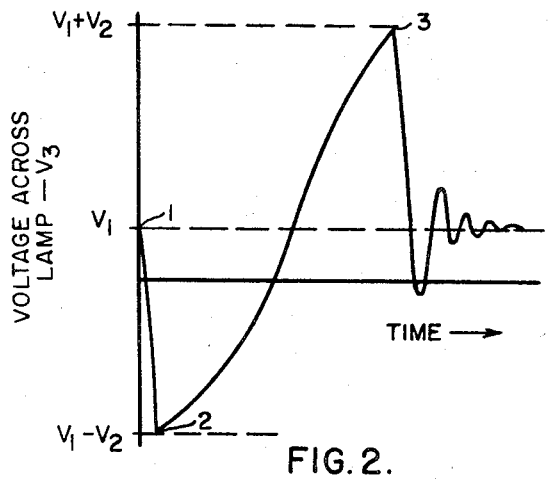

These and other objects and advantages of the present invention will become more apparent when considered in view of the following detailed description and drawings, in which:

FIGURE 1 is a diagramamtic representation of a preferred embodiment of the electrical triggering system in accordance with the teachings of this invention; and FIG. 2 is a graphical representation of the voltages as established across the gas discharge device incorporated within the system of FIGURE 1.

Referring now to the drawings and in particular to FIGURE 1, there is shown an electrical charging system 10 including a suitable gas discharge device 20 for producing a very intense emission of light. Illustratively, a xenon flash tube such as made by Edgerton, Germauschen, and Grier and designated FX 65 could be incorporated in system 10 and would provide a suitable light emission to pump a laser. Although the electron discharge device 20 is illustratively shown as a xenon flash tube it is apparent that other types of gas discharge devices may be used. The gas discharge device 20 includes a pair of electrode 22 and 24 between which the electrical discharge takes place to thereby generate the intense emission of light. The potential required to maintain the discharge between electrodes 22 and 24 of the gas discharge device 20 is provided by a storage capacitor means such as a capacitor 16 which is disposed across the electrodes 22 and 24. Further, a winding or inductive element 18 is inserted in series between the capacitor 16 and the gas discharge device 20 to limit the maximum amount of current by the discharge across the electron discharge device 20. As will be explained later in greater detail, the inductive element 18 also serves to insure that the initial ionization of the gas within the gas discharge device 20 does take place. More specifically, one terminal of the capacitor 16 is connected directly to the electrode 24 and the other terminal of the capacitor 16 is connected through the inductive element 18 to the terminal 22. In order to establish a potential across the capacitor 16, a suitable direct current source, such as a battery 12, is disposed across the capacitor 16. More particularly, the negative terminal of the battery 12 is connected to one terminal of the capacitor element 16 whereas the positive terminal of the battery 12 is connected through a switch 15 and a suitable current limiting impedance such as a resistor 14 to the common terminal of the capacitor element 16 and the inductive element 18. The resistor 14 serves to limit the current that may be directed through the capacitor 16 and to control the rate of potential placed thereon. In order to establish a potential across the capacitor 16, the switch 15 is closed thereby charging the capacitor 16 to approximately the potential $V_1$ of the battery 12. It may be understood that the potential $V_1$ now estabilshed across the capacitor 16 is insufficient to cause a breakdown between the electrodes 22 and 24 of the electron discharge device 20.

In accordance with the teachings of this invention, the initial ionization of the gas within the gas discharge device 20 is provided by applying a voltage pulse directly to the electrodes of the gas discharge device 20. More specifically, a voltage substantially equal to the potential $V_2$ is established upon a capacitor 26 as by a suitable direct current voltage source such as a battery 28 which is connected in series through a current limiting impedance such as a resistor 32 to the capacitor 26.

It is noted that the capacitor 26 is directly connected as through a low impedance conductor to electrode 22 of the gas discharge device 20. Further, a suitable switching means such as a hydrogen thyratron 30 is disposed between the capacitor 26 and ground. More specifically, the anode of the thyratron 30 is connected to the common terminal of the resistor 32 and of the capacitor 26, and the cathode is connected to the common terminal of the electrode 24 and of the negative terminal of the battery 28. Further, the positive terminal of the battery 28 is connected serially through the resistor 32 to the other terminal of the capacitor 26. Illustratively, the thyratron 30 may be that hydrogen thyratron commonly designated by the number 6279/5C22. Normally, the thyratron 30 is in a nonconductive condition and, as a result, the potential established across the capacitor 26 is applied substantially across the thyratron 30 and not the gas discharge device 20. In order to bring the thyratron 30 into a conductive mode, it is necessary to provide a voltage pulse upon the grid of this device. Though there are other circuits which are known in the art for providing a voltage pulse, there is shown in FIG. 1 an illustrative embodiment of a pulsing circuit 44 which includes a suitable direct current voltage source such as battery 36 for charging a capacitor 34 through a suitable current limiting impedance such as a resistor 42. Further, a suitable resistive element 40 of a magnitude in the order of one-tenth or less than the value of the resistor 42 is inserted between the grid and the cathode of the thyratron 30. A switch 38 is inserted between the junction of the grid of the thyratron 30 and the resistor 40, and the common point between the resistor 42 and the capacitor 34. In operation, the battery 36 charges the capacitor 34 through the current limiting impedance 40; then the switch 38 may be closed thereby discharging the capacitor 34 through the resistor 40 to provide a voltage pulse upon the grid of the thyratron 30.

In operation, the initial step (noted in FIG. 2 by numeral 1) is to close switch 15 to thereby charge the capacitor 16 to a potential substantially equal to the potential $V_1$ of the battery 12. As a result, the capacitor 16 imposes a potential substantially equal to $V_1$ across the electrodes 22 and 24 of the gas discharge device 20. As stated above the potential $V_1$ is insufficient to cause a breakdown between the terminals 22 and 24 of the gas discharge device 20. With the thyratron 30 in a nonconductive state, the capacitor 26 is charged by the battery 28 to a potential substantially equal to $V_2$. To render the thyratron conductive, the switch 38 is closed thereby discharging the capacitor 34 to provide a voltage impulse upon the grid of the thyratron 30. When the thyratron 30 is disposed in a conductive condition, the capacitor 26 is disposed directly across the gas discharge device 20. More specifically, one terminal of the capacitor 26 is connected directly to the electrode 22 whereas the other terminal of the capacitor 26 is connected serially through the thyratron 30, which in a conductive condition presents a very low impedance to ground. Electrode 24 is likewise connected to ground thereby electrically connecting the electrode 24 and the lower terminal of the capacitor 26. At the moment (noted by numeral 2 in FIG. 2) capacitor 26 is disposed across electrodes 22 and 24 of the gas discharge device 20, the potential $V_3$ across gas discharge device is then the difference between the potential $V_1$ and $V_2$. It is noted, as shown by the arrow of FIG. 1, that the capacitor 26 is charged in an opposite sense to the potential $V_1$. As a result, a negative voltage is placed across the electrodes 22 and 24 which is of sufficient magnitude to cause the initial ionization of the gas discharge device 20 to thereby allow the potential stored upon the capacitor 16 to be then discharged through the gas discharge device 20. It is noted that the initial ionization of the gas within the gas discharge device 20 reduces the resistivity of this device to such a level that the energy stored in the capacitor 16 is capable of discharging through the gas discharge device 20.

If the gas discharge device 20 should for some reason fail to ionize sufficiently to permit the capacitor 16 to discharge therethrough at the peak potential of $V_1-V_2$, the electrical triggering system 10 in accordance with the teachings of this invention, will provide a resonant circuit whereby a positive peak of potential will be applied across the gas discharge device 20. More specifically, the capacitor 26 is connected, as explained above, between the electrode 22, and the common junction between the electrode 22 and the inductive element 18. Therefore, a series resonant circuit is formed by the capacitor 16 and the inductive element 18 connected in series, and the capacitor 26 which are disposed in parallel across the electrodes 22 and 24 of the gas discharge device 20. Thus, the resonant circuit formed by the capacitors 16 and 26 and the inductive element 18 will cause the capacitor 26 to charge to a positive voltage approximately equal in magnitude to $V_1+V_2$. At this point in time designated by the numeral 3, the potential $V_1+V_2$, which is greater than $V_1-V_2$, is placed across the electrodes 22 and 24 thereby providing even greater initial ionization of the gas within the gas discharge device 20. The resonant frequency ($f$) of the circuit is given by the expression:

$$f=\frac{1}{2\pi\sqrt{\frac{LC_1\times C}{C_1+C}}}$$

where L is the value of the inductance of element 18, $C_1$ is equal to the capacitance of capacitor 26, and C is equal to the capacitance of the capacitor 16. In the usual case where the value of the capacitance of capacitor 16 is much greater than the value of the capacitor 26, the resonant frequency $f$ is approximately by the expression:

$$\frac{1}{2\pi\sqrt{LC_1}}$$

Typically, the value of capacitor 16 (i.e., C) is greater than the value of capacitor 26 (i.e., $C_1$) by a factor of approximately 100,000. If the gas discharge device 20 fails to breakdown at the higher peak potential of $V_1+V_2$ the resonant circuit will continue to oscillate about $V_1$ with a damped sinusoidal voltage whose frequency is determined by L, $C_1$, C and stray capacitances and inductances of the circuit.

The electrical charging system 10 as shown and described above has been tested and experimental results have shown that reliable discharges of gas discharge device may be achieved with voltages (i.e., $V_1$) of about ⅙ of that required when using the conventional external trigger electrode. Further, a lower trigger voltage is required to initiate ionization because the trigger voltage is applied across the electrodes of the electron discharge device. In accordance with the teachings of this invention, no separate external trigger electrode is required; the cost of such a system is reduced, and the electron discharge device of this system may be cooled by being immersed in water without causing erratic firing due to the presence of the cooling medium between the turns of the external trigger electrode. In addition, a more uniform initial breakdown across the gas of the gas discharge device occurs since the breakdown occurs between the electrodes of this device. Finally, if the gas discharge device fails to fire on the first peak of the oscillatory wave, a second peak of a higher voltage is automatically impressed across the electron discharge device thereby increasing the probability that an electrical breakdown will occur within the gas discharge device.

Since numerous changes may be made in the above-described apparatus and different embodiments of the invention may be made without departing from the spirit thereof, it is intended that all matter contained in the foregoing description or shown in the accompanying drawings, shall be interpreted as illustrative and not in a limiting sense.

We claim:

1. An electrical triggering system for a gas discharge device having first and second electrodes for establishing an electrical discharge through a gaseous medium; said system comprising a first discharge circuit connected across said first and second electrodes and including a first capacitor, and an inductive element connected in series; first means for charging said first capacitor; a second discharge circuit connected across said first and second electrodes, and including a second capacitor and switching means for closing said second discharge circuit to discharge the energy stored in said second capacitor through said gas discharge device; and second means for charging said second capacitor, said second means being connected to said second capacitor to charge said second capacitor to a given potential, said switching means connecting said second capacitor to the gas discharge device so that said given potential of said second capacitor is of an opposite polarity with respect to the potential established upon said first capacitor by said first means.

2. An electrical triggering system as claimed in claim 1, wherein said switching means forms when closed a resonant circuit including said first and second capacitors and said inductive element.

3. An electrical triggering system as claimed in claim 1, wherein said inductive element is of such a value to effectively isolate the potential stored upon said first and second capacitors.

4. An electrical triggering system as claimed in claim 1, wherein the impedance of said first capacitor is substantially greater than that of said second capacitor.

References Cited

UNITED STATES PATENTS

| | | | |
|---|---|---|---|
| 2,417,489 | 3/1947 | Hasler et al. | 315—172 |
| 2,722,631 | 11/1955 | Bowtell | 315—243 |
| 3,274,439 | 9/1966 | Tompkins | 315—160 |

JOHN W. HUCKERT, *Primary Examiner.*

J. D. CRAIG, *Assistant Examiner.*